US012779702B2

(12) United States Patent
Bosboom et al.

(10) Patent No.: US 12,779,702 B2
(45) Date of Patent: Nov. 3, 2026

(54) APPARATUS, SYSTEM AND METHOD FOR A FLOATING END EFFECTOR MODULE

(71) Applicant: JABIL INC., St. Petersburg, FL (US)

(72) Inventors: Jeroen Bosboom, St. Petersburg, FL (US); Danny Rivera, St. Petersburg, FL (US); Ward Palmer, St. Petersburg, FL (US); Babak Naderi, St. Petersburg, FL (US); Michael Patrick McKenney, St. Petersburg, FL (US); Lucas Nielsen, St. Petersburg, FL (US)

(73) Assignee: JABIL INC.

( * ) Notice: Subject to any disclaimer, the term of this patent is extended or adjusted under 35 U.S.C. 154(b) by 981 days.

(21) Appl. No.: 18/012,825

(22) PCT Filed: Jun. 25, 2021

(86) PCT No.: PCT/US2021/039100
§ 371 (c)(1),
(2) Date: Dec. 23, 2022

(87) PCT Pub. No.: WO2021/263109
PCT Pub. Date: Dec. 30, 2021

(65) Prior Publication Data

US 2023/0271333 A1 Aug. 31, 2023

Related U.S. Application Data

(60) Provisional application No. 63/043,911, filed on Jun. 25, 2020.

(51) Int. Cl.

| | |
|---|---|
| ***B25J 15/00*** | (2006.01) |
| ***B25J 15/02*** | (2006.01) |
| ***F16C 32/06*** | (2006.01) |

(52) U.S. Cl.
CPC ....... *B25J 15/0023* (2013.01); *B25J 15/0052* (2013.01); *B25J 15/02* (2013.01); *F16C 32/0614* (2013.01); *F16C 2322/59* (2013.01)

(58) Field of Classification Search
CPC .... B25J 15/0023; B25J 15/0052; B25J 15/02; B25J 17/0208; F16C 32/0614;
(Continued)

(56) References Cited

U.S. PATENT DOCUMENTS 4,600,228 A 7/1986 Tarbuck
4,733,895 A * 3/1988 Hawkes .................. B25J 15/02 294/198
(Continued)

FOREIGN PATENT DOCUMENTS

CN 104364893 2/2015
WO 02067649 A1 8/2002

OTHER PUBLICATIONS

Chinese Office Action (including English translation) issued in App. No. CN202180059598, dated May 23, 2025, 21 pages.
(Continued)

*Primary Examiner* — Stephen A Vu
(74) *Attorney, Agent, or Firm* — Riverside Law LLP

(57) ABSTRACT

An apparatus, system and method for providing a floating end effector for grasping small precision parts. The end effector includes at least one end effector module having at least: tooling for grasping a part for pickup and placement; a module shaft connected on a first end to the tooling, and having a second end opposite the tooling; and at least two air bearing associated with the second end, wherein the at least two air bearings in combination impart degrees of freedom to the tooling in at least x and y axes and in theta.

19 Claims, 4 Drawing Sheets

(58) Field of Classification Search
CPC .............. F16C 32/0618; F16C 32/0622; F16C 32/0625; F16C 2322/59
See application file for complete search history.

(56) References Cited

U.S. PATENT DOCUMENTS

| | | | | | |
|---|---|---|---|---|---|
| 4,741,567 | A | * | 5/1988 | Zimmer | B25J 15/0616 414/737 |
| 4,884,329 | A | | 12/1989 | Higuchi | |
| 5,219,264 | A | * | 6/1993 | McClure | G06T 1/0014 414/730 |
| 5,308,132 | A | | 5/1994 | Kirby et al. | |
| 2002/0116090 | A1 | | 8/2002 | Fischer | |
| 2018/0178393 | A1 | | 6/2018 | Saketi | |
| 2020/0078960 | A1 | * | 3/2020 | Matsumoto | B25J 15/0293 |
| 2020/0180164 | A1 | * | 6/2020 | Boudreau | B25J 15/02 |

OTHER PUBLICATIONS

International Search Report for PCT/US2021/039100, dated Oct. 8, 2021.
Written Opinion of the International Searching Authority for PCT/US2021/039100, dated Oct. 6, 2021.
International Preliminary Report on Patentability for PCT/US2021/039100, dated Dec. 13, 2022.

* cited by examiner

APPARATUS, SYSTEM AND METHOD FOR A FLOATING END EFFECTOR MODULE

CROSS-REFERENCE TO RELATED APPLICATION

This application claims the benefit of priority to International Application No. PCT/US2021/039100, filed Jun. 25, 2021, entitled: APPARATUS, SYSTEM AND METHOD FOR A FLOATING END EFFECTOR MODULE, which claims priority to U.S. Provisional Application No. 63/043,911, filed Jun. 25, 2020, entitled APPARATUS, SYSTEM AND METHOD FOR A FLOATING END EFFECTOR MODULE, the entirety of which is incorporated herein by reference as if set forth in its entirety.

BACKGROUND

Field of the Disclosure

The disclosure is directed to a pick and place end effector and, more particularly, to an apparatus, system and method for providing a floating end effector module.

Description of the Background

The use of robotics is well established as a manufacturing expedient, particularly in applications where human handling is inefficient and/or ineffective-such as during the precise placement of small parts. Current practice to robotically install very small, precise parts using end effectors suffers from many disadvantages-namely, the tendency to torque, misalign, or break the part. This is the case because current end effectors do not provide an accounting for the variability in the sizes, shapes and composition of tiny precision parts, and further do not account for variations in pickup or placement locations.

As such, the assembly of products using very small precision parts is fraught with challenges in a manufacturing setting. First and foremost, the pick and place end effector's tooling must be miniaturized in order to grasp the tiny part. However, this miniaturized tooling must be not only capable of grasping the part, it must be able to do so without damaging or torqueing the part, and by grasping the part while maintaining the ability to have an awareness of the positions of various aspects of the part for placement.

Further, it is often the case that parts, and particularly tiny precision parts, may move, either during grasping or while grasped by an end effector, prior to placement. Nevertheless, the parts must be properly placed, even if an exceedingly high level of precision for re-adjustment is not provided by the end effector tooling, such as due to the high level of expense for such equipment.

More particularly, adding degrees of freedom and high levels of sensitivity to place and manipulate tiny parts in x-y-z and theta results in a very expensive, temperamental end effector assembly. Such an assembly also generally suffers from too much lash and excessive inertia to allow for the handling of tiny, fragile parts.

Thus, the need exists for an improved end effector capable of placing tiny, precision parts in a manufacturing setting.

SUMMARY

Certain embodiments are and include an apparatus, system and method for providing a floating end effector for grasping small precision parts. The end effector includes at least one end effector module having at least: tooling for grasping a part for pickup and placement; a module shaft connected on a first end to the tooling, and having a second end opposite the tooling; and at least two air bearing associated with the second end, wherein the at least two air bearings in combination impart degrees of freedom to the tooling in at least x and y axes and in theta.

Thus, the disclosure provides at least an improved apparatus, system and method for an improved end effector capable of placing tiny, precision parts in a manufacturing setting.

BRIEF DESCRIPTION OF THE DRAWINGS

The exemplary compositions, systems, and methods shall be described hereinafter with reference to the attached drawings, which are given as non-limiting examples only, in which.

DETAILED DESCRIPTION

Figure 1:
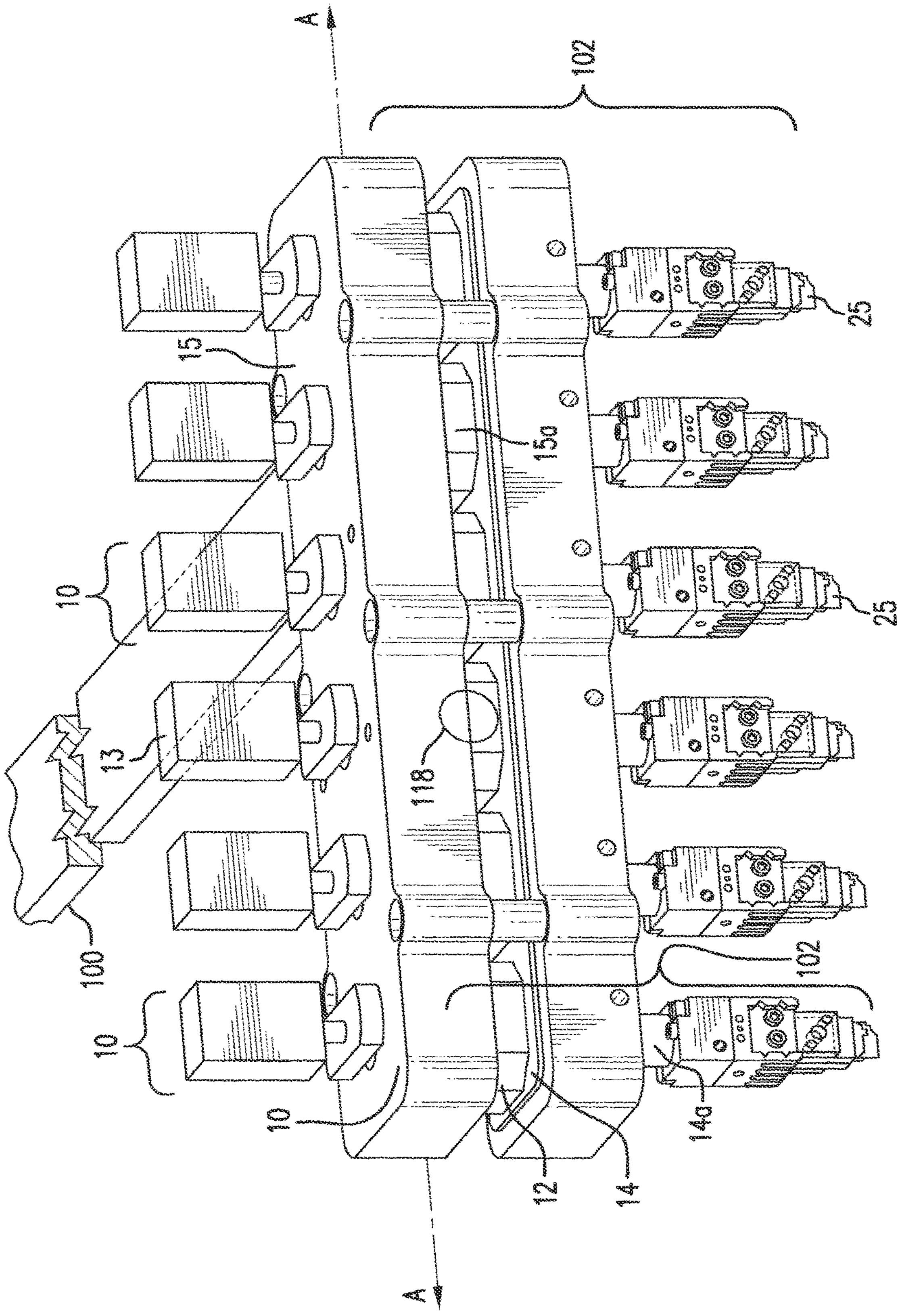
FIG. 1 is an illustration of a floating end effector module.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the disclosed embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Thus, terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The embodiments take advantage, in part, of the lifting properties of air bearings. These air bearings may be used, for example, in a multi-position modular pick and place end effector. The end effector may be bench mounted, by way of non-limiting example.

The modules may be arranged as needed on the end effector arm, such as in a circle, in parallel rows, or in single modules. The air bearings allow for each module to provide ultra low mass, ultra-low inertia positioning for tiny, delicate parts. For example, features throughout may be formed of aluminum and/or be plated so as to provide very low mass and so as to add very little inertia to the module.

This minimal inertia and low mass gripping allows the module head to "float" on the air bearings. This floating overcomes the significant disadvantages of the rolling bearings used in the known art. For example, the adjustable float provided in the embodiments provides an increased level of tolerance for part variation and presentation variation for pick and place as compared to the known art.

The modules can be arranged in clusters of similar or dissimilar types, depending on the application. For example, four, six or eight identical or different modules may be arranged in a row on a particular end effector that carries the modules.

One advantage of such embodiments is the ability to place multiple small precision parts at a time, even if they are of different types or sizes, with a very compact end effector. Thereby, the embodiments save on the cost of extra production work stations, decrease assembly-line length by allowing for the placement of all payload at once, and are translatable across many configurations of parallel tooling.

For each air bearing, upper and lower plates may incorporate channels for air distribution. Further, porous ceramic inserts may be used for finer air distribution and lessened vibration. The air plates may be spaced 3-35 microns over the moving elements, or more precisely to provide 15-25 microns over the moving elements. This limited distance minimizes air bleed and vacuum lock bleed.

The air plates may incorporate a pressurized air top and bottom, and a vacuum, to either or both of the top and bottom plate. For example, to lock a gripped part in position, air float may be switched-off to the top plate, and the vacuum turned-on to provide a rapid positional lock.

Each module may include a centering function to initialize a position, and to later provide any necessary repositioning. The centering function may be provided by a recentering cylinder. The recentering cylinder may be low mass and low inertia.

Accordingly, an operating cycle of the embodiments may include: centering the modules; picking parts, such as from dedicated tooling with, for example, part registration upon picking; floating the modules while picking the part and engaging tooling; using vacuum to lock the picked part; proceeding to the insertion point and partially engaging the part with the insertion point as needed; and floating the module and lowering the part into the insertion point using the robot to complete the insertion.

Other components, such as small servo motors, flat motors, piezo motors, voice coil motors and the like may be used in the embodiments to drive each module individually, such as in one, two or all of their axis (x, y, z and theta). A servo-driven module may enable machine-vision positional correction of each individual module. For example, machine/robot-vision on the end effector or the end effector's robotic arm or housing work cell may capture the x-y, theta location. A calibrated module head may then reposition based on any minor variance "seen" by the machine vision, and may thus more readily acquire the parts with its grippers without damage or misalignment. An additional machine vision camera may then capture the part's features, and the module head may then again be automatically repositioned so that the insertion features of the part are properly positioned for placement or insertion.

Yet further, additional functionality may be added by monitoring the float using cameras or sensors, such as to provide vision/machine vision, both for acquiring and for placing the small parts. This camera may be associated with the end effector housing in order to adjust each module head for optimal picking and placement. Thereby, variances in product upon pick and place can be mitigated by compensating the module head position.

Prior art solutions are typically based on a multiple rolling bearing modules stacked on top of one another. Such systems are susceptible to binding and high friction. Such systems require oil for the bearings, and have high levels of lash due to the separate bearings for each axis.

The lighter weight and mass, and the lower inertia of the disclosed embodiments are advantageous for handling small, fragile, high precision parts, such as mini- or microparts, such as optical or microelectronic components. The embodiments provide a modular and configurable design. The modules are highly robust and relatively maintenance free in comparison to the known art.

The embodiments may be employed on any production line, by way of non-limiting example. Products created on such production lines include consumer products, automotive parts, and the like.

More specifically, the embodiments may have multiple, such as the aforementioned 2, 4, 6, or 8 modules, all capable of "floating" at least in the x and y axes, and in rotational angle theta. FIG. 1 shows 6 such modules 10. These modules 10 may be associated with a pick and place end effector 100.

Each module 10, and specifically the pick and place module head 102 of each module, is communicatively associated with at least one air bearing 14, 15. The air bearings 14, 15 provide the aforementioned degrees of freedom to "float" the module head 102, such as during picking and placing by the tooling/grabber/gripper 25 at the end of the module head 102, and may additionally be associated with a vacuum 14*a*, 15*a*. Upon actuation, the vacuum lock 14*a*, 15*a* may evacuate the air from the air bearing 14, 15, thereby eliminating the float and thus positionally locking the respective module head 102.

The air bearings 14, 15 may comprise at least an upper air bearing 15, which may provide downward pressure on the module head 102, and a lower air bearing 14, which may provide upward pressure on the module head. 102 Accordingly, the lower air bearing 14 may control during the "pick" mode of the end effector module 10, and the upper air bearing 15 may control during the "place" mode of the end effector module 10.

The upper and lower air bearings 14, 15, absent a vacuum lock, enable the disclosed independent movement in x, y and theta with respect to axis A in FIG. 1. The dedicated float 12 provided by air bearings 14, 15 associated with each individual module head 102 allow for individualized refined positional adjustment in x, y and theta for each picked part, translated to the grabbing end 25 of each module head 102. In certain alternative embodiments, each axis and rotational adjustment may be motor driven 118, such as servo-motor driven, Therefore, the module head 102 may react in a tactile manner to the part picked and placed at tooling 25. That is, the air bearing 14, 15 may move or deflect for very small parts having partially variable position. More specifically, a part may have a positionally known center portion, but may have outer portions that coil outwardly from the inner portion, and which may thus necessarily be put in different positions for each placement. Yet further, the tactile pick or placement may cause a deflection of the module head's grabber 25 upward if an obstruction is encountered, as the "float" 12 provided for each module 10 by the air bearings 14, 15 may "feel" the obstruction and react by rejecting the pick or place. As such, each module 10 may protect parts and products from damage in the case of obstruction or misalignment, such as by rejecting the action, lifting back up, and retrying or rejecting the action by the module head 102 based on the tactile nature of the float 12.

Moreover, the delicate tactile nature of the air bearing float 12 may be furthered by inclusion of a tactile bearing (not shown). For example, a tactile bearing may be included in the vertical axis, such as to provide a vertical tactile sensitivity during full downward and full upward motion of the module head.

Each module 10 may also include an independent (with respect to the other module(s)) re-centering cylinder 13. The recentering cylinder 13 may comprise a small air cylinder driving conical pins into the top of the module plate, thereby centering the module. That is, these cylinders 13 may readily return the module head 102, or the picked part, to a known prior position.

Figure 2:
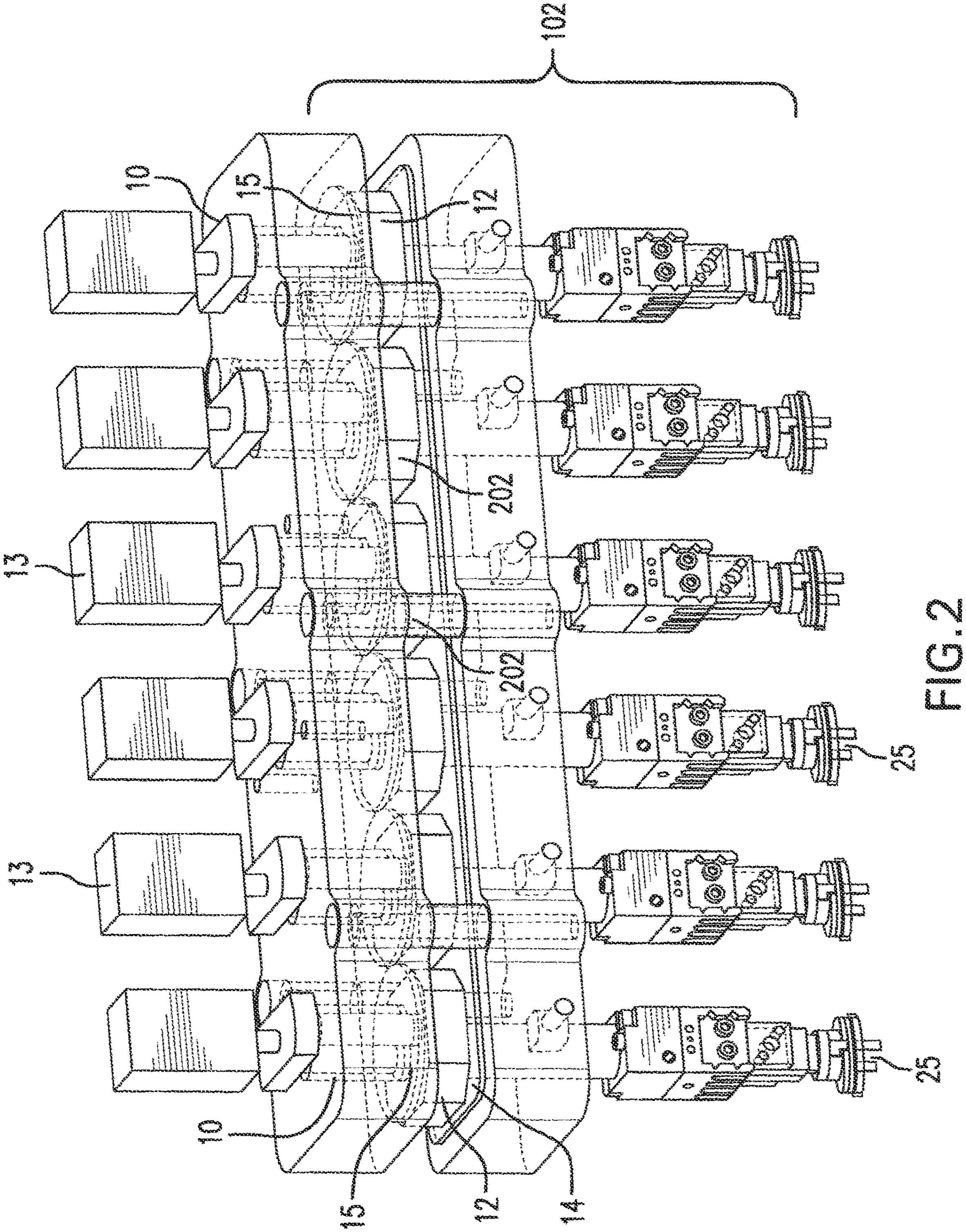
FIG. 2 is an illustration of aspects of a floating end effector module.
Figure 4:
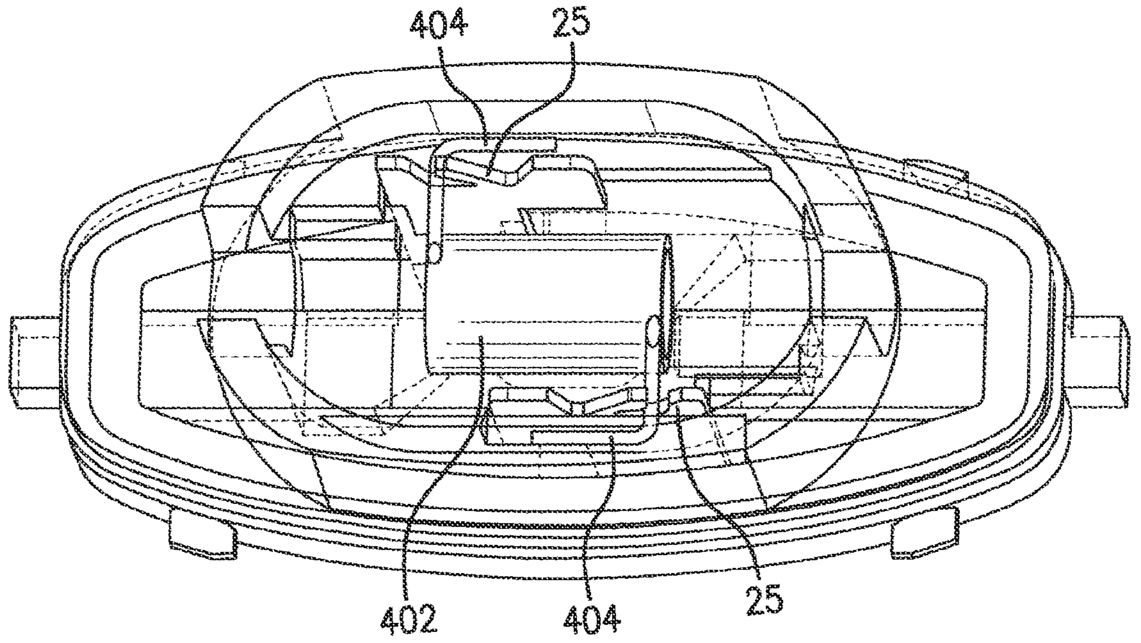
FIG. 4 is an illustration of aspects of a floating end effector module.

FIG. 2 illustrates an embodiment in which a small precision part may be picked and placed. For example, the part picked and placed may be a spring with a center coil having the coil wire bent outwards at its end portions for attachment of those end portions upon placement, such as is shown in FIG. 4. Small springs are historically extremely difficult to pick and place, in part because of the variability in positioning presented by the distal portions of the spring.

To address the aforementioned difficulty, the float 12 provided in the embodiments to the pick and place module head 102 by the air bearings 14, 15 allows for the module head 102 to provide a gentle float pressure to the small part, such as the aforementioned spring, that allows the spring (and/or the module head 102) to deflect as it is picked. Further, as the module tooling 25 places the spring, the module head 102 again allows a floating deflection to ensure appropriate placement of the spring. This picking and placing floating deflection is not possible with known rolling bearings.

More specifically in relation to an exemplary pick of a small spring, by way of non-limiting example, the ends of the spring may be provided to the module head with the spring ends held at a known position. However, the spring coil may thus be deflected and/or rotated from a suspected position. Thus, the ability of the module head 102 to float 12, such as may be imparted by the air-bearing driven chucks 202 shown in FIG. 2, during a pick of a small coil, for example, is a necessity for an optimal pick of a small precision item, and is provided in the embodiments but not in the known art.

Regarding specifically the placing of a small precision part, the float of the module head allows for a gentle "bottoming" of the part into place. That is, the part may be floated downward until it bottoms out, at which point the float allows for the part to not suffer any additional pressure that might cause deformation or breakage. Further, the bottoming of the part until a responsive pressure is applied to the float provides maximum probability that the floating nature of the pick downward will allow for a natural alignment of even distal aspects of the small part, such as a spring, into its proper placement position.

Accordingly, the float of the module head may enable multiple pick and place modes. By way of non-limiting example, a centered pick mode may be employed wherein only part of the picked part, such as its center or its ends, is grabbed, such as in the case referenced herein in which only the center coil or unwound ends of a spring part is grabbed. Additionally and by way of example, the downward floating placement until a bottoming out occurs, such as is referenced above, may constitute a self-guided mode, and may similarly be employed during picking.

As referenced, the known art employs rolling bearings on its pick and place modules. Because these rolling bearings are not capable of floating in multiple axes, a multiple axis adjustment in at least two of x, y and theta causes undue friction on the bearings, which imparts an undesirable force to the subjected part. This undesirable force may cause deflection or destruction of small parts.

Other advantages of the embodiments over known rolling-element bearing systems may include: smaller packaging (in a rolling bearing system, each axis adjustment is stacked on top of the others); and minimal actuation lash due, at least in part, to a 25 micron air gap, by way of example. Yet further, the configurable and modular design in the embodiments provides several advantages, including: multi-mode operation, in which a part can be "bottomed" without damage to the part or the air bearings, as discussed herein; and configurable module patterns that may include, by way of non-limiting example, inline, round, square, arc, hanging or supporting. Finally, the ability to switch readily between floating and vacuum lock modes means a very short cycle time versus known end effectors.

Figure 3:
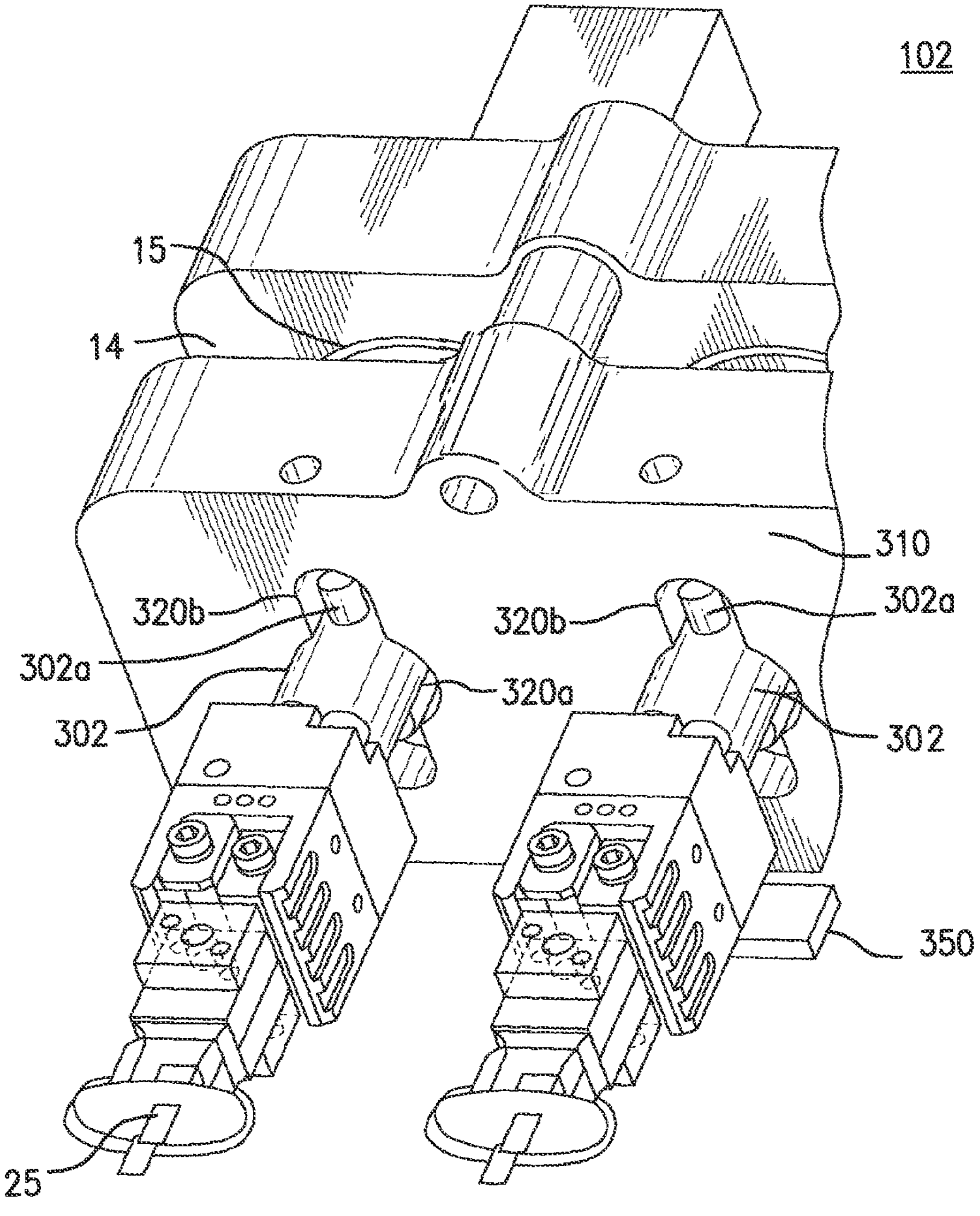
FIG. 3 is an illustration of aspects of a floating end effector module.

As shown in FIG. 3, each module head 102 may connect to a module shaft 302. The module shaft 302 may pass between the module head's grabber 25 and the module's air bearings 14, 15 through, for example, an end effector frame bar or strip bar 310 that may have multiple such module shafts passing therethrough.

More specifically, this passthrough 320 for the module shaft may constitute a through-hole 320*a*, which necessarily has a limited size and shape. As such, the passthrough 320 and the module shaft 302, in combination, may physically limit the x, y and theta float that can be provided to the module grabber 25 by the air bearings 14, 15.

The limiting on float along the x and y axes and theta becomes important for a variety of reasons. First and foremost, it enables a known positioning and variation in positioning, thereby allowing for execution of re-centering by the recentering cylinder (discussed above) from and to a known position. Similarly, the physical limitations on the module shaft 302 prevent the possibility of a gross misalignment.

Accordingly, the limiting through hole 320*a* may be designed so as to provide the desired limitation on float. By way of example and as shown, a "keyhole" design may limit movement of the module shaft in multiple axes, such as by including a central passthrough 320*a*, but with radially extending "keyhole" slots 320*b* that receive pins 302*a* extending radially outward from the substantially cylindrical main portion of the module shaft 302. Also shown in FIG. 3 is an optional machine-vision camera 350.

FIG. 4 illustrates the pick and place of a small center coil 402 having bare, helically bent, unwound wire 404 at its distal points, such as is discussed above in relation to FIG. 2. For the exemplary part shown, the center coil 402 is, obviously, a spiral, while the contacts 404 at the distal portions are helical and unwound compared to the center coil. In typical prior art embodiments, grasping of the center coil of FIG. 4 would cause the center coil to rotate, thereby misaligning the distal contacts with the insertion location.

However, the embodiments provide a solution to this pick and place issue. More particularly, placing using the degrees of freedom and low inertia provided in x, y and theta by the disclosed air bearings readily allows for the helical paths to be followed, such as by gently bottoming the gripper 25 to thereby bottom out the spring 402 into the placement location until natural alignment of the outer contacts 404 to the placement location.

The foregoing apparatuses, systems and methods may also include the control of the various robotic and gripping functionality referenced throughout. Such control may include, by way of non-limiting example, manual control using one or more user interfaces, such as a controller, a keyboard, a mouse, a touch screen, or the like, to allow a user to input instructions for execution by software code associated with the robotics and with the systems discussed herein. Additionally, and as is well known to those skilled in the art, system control may also be fully automated, such as wherein manual user interaction only occurs to "set up" and program the referenced functionality, i.e., a user may only initially program or upload computing code to carry out the predetermined movements and operational sequences discussed throughout. In either a manual or automated embodiment, or in any combination thereof, the control may be programmed, for example, to relate the known positions of substrates, the robotics, the stationary point, and the relative positions there between, for example.

It will be appreciated that the herein described systems and methods may operate pursuant to and/or be controlled by any computing environment, and thus the computing environment employed not limit the implementation of the herein described systems and methods to computing environments having differing components and configurations. That is, the concepts described herein may be implemented in any of various computing environments using any of various components and configurations.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An end effector module, comprising:
tooling for grasping a part for pickup and placement;
a module shaft connected on a first end to the tooling, and having a second end opposite the tooling;
at least two air bearings associated with the second end, wherein the at least two air bearings in combination impart degrees of freedom to the tooling in at least x and y axes and in a rotational angle theta; and
at least two motors to drive adjustments in the x axis, the y axis and the rotational angle theta.

2. The end effector module of claim 1, additionally comprising a vacuum fluidically connected to at least one of the air bearings, wherein actuation of the vacuum evacuate air from the connected at least one air bearing, thereby effecting a positional vacuum lock of the module shaft.

3. The end effector module of claim 1, wherein the at least two air bearings comprise an upper air bearing capable of providing downward pressure on the tooling, and a lower air bearing capable of providing upward pressure on the tooling.

4. The end effector module of claim 3, wherein the lower air bearing effectuates the pickup by the tooling.

5. The end effector module of claim 3, wherein the upper air bearing effectuates the placement by the tooling.

6. The end effector module of claim 1, wherein each of the at least two motors comprises a servo motor.

7. The end effector module of claim 1, wherein the at least two air bearings deflect the tooling upon external pressure on the tooling.

8. The end effector module of claim 7, wherein the external pressure comprises an obstruction.

9. The end effector module of claim 8, wherein the obstruction is upon the placement.

10. The end effector module of claim 7, wherein the external pressure comprises a bottoming out upon the placement.

11. The end effector module of claim 7, wherein, upon the deflection, the tooling is pulled up.

12. The end effector module of claim 1, further comprising a recentering cylinder associated with at least the module shaft.

13. The end effector module of claim 12, wherein the recentering cylinder comprises a known center position for the tooling.

14. The end effector module of claim 13, wherein the recentering cylinder comprises an air cylinder driving conical pins.

15. The end effector module of claim 1, wherein the part comprises a spring.

16. The end effector module of claim 1, wherein the placement is self guided by the air bearings.

17. The end effector module of claim 1, further comprising a shaft frame through which the module shaft passes.

18. The end effector module of claim 17, wherein a size and shape of the shaft frame limits actuation of the air bearings.

19. The end effector module of claim 18, wherein the shaft frame comprises radial slots capable of receiving pins on the module shaft.

* * * * *